(12) United States Patent
Stark

(10) Patent No.: US 7,748,690 B2
(45) Date of Patent: Jul. 6, 2010

(54) QUICK-ACTION CLAMPING CYLINDER WITH AN ANTI-BLOCKING SAFETY DEVICE

(75) Inventor: Günther Jakob Stark, Fussach (AT)

(73) Assignee: Andreas Maier GmbH & Co. KG, Fellbach (DE)

( * ) Notice: Subject to any disclaimer, the term of this patent is extended or adjusted under 35 U.S.C. 154(b) by 708 days.

(21) Appl. No.: 10/588,676

(22) PCT Filed: Feb. 9, 2005

(86) PCT No.: PCT/EP2005/001291

§ 371 (c)(1),
(2), (4) Date: Nov. 30, 2006

(87) PCT Pub. No.: WO2005/075145

PCT Pub. Date: Aug. 18, 2005

(65) Prior Publication Data

US 2007/0210501 A1 Sep. 13, 2007

(30) Foreign Application Priority Data

Feb. 9, 2004 (DE) .................... 10 2004 006 418

(51) Int. Cl.
*B23Q 3/00* (2006.01)
(52) U.S. Cl. ..................................... 269/309; 269/310
(58) Field of Classification Search ................ 269/309, 269/310, 32, 24–27; 279/4.06, 4.12
See application file for complete search history.

(56) References Cited

U.S. PATENT DOCUMENTS 5,909,882 A    6/1999   Schill et al.

(Continued)

FOREIGN PATENT DOCUMENTS

DE            25 32 330 A1    2/1997

(Continued)

*Primary Examiner*—Lee D Wilson
(74) *Attorney, Agent, or Firm*—Norris McLaughlin & Marcus, PA; Christa Hildebrand, Esq.

(57) ABSTRACT

A quick-action cylinder with safety device to prevent blocking is described, wherein the quick-action cylinder provides a mechanical lock for a center draw-in nipple (2) in a center bore (23) in a housing of a quick-action cylinder, wherein in the locked position one or more locking members (3) are urged into contact with an exterior periphery of the draw-in nipple by a force of a spring assembly (12) which is arranged in the housing in one or several spring compartments (13), and wherein the unlocked position of the draw-in nipple (2) is attained by applying pressure to a locking piston (7) which operates to oppose the force of the spring assembly. The safety device prevents self-blocking of the locking device of the draw-in nipple (2) in the center bore (23) when the pressure medium enters the spring compartment (13) of the spring assembly (12) from the cylinder space (11) of the locking piston. For this purpose, a relief bore (15; 25; 26) is disposed in the spring compartment (13), extending to a lower-pressure clearance space (19). One or more pressure elements (16; 21; 24; 27) are arranged in the region of the relief bore which are brought into an open position in the event of an overpressure in the spring compartment (13), thereby discharging the pressure medium from the spring compartment (13).

11 Claims, 2 Drawing Sheets

U.S. PATENT DOCUMENTS

| | | | |
|---|---|---|---|
| 6,170,836 B1 * | 1/2001 | Etter | 279/4.06 |
| 6,273,434 B1 * | 8/2001 | Stark | 279/4.06 |
| 6,530,568 B2 * | 3/2003 | Etter | 269/309 |
| 6,997,448 B2 * | 2/2006 | Roth et al. | 269/309 |
| 7,168,695 B2 * | 1/2007 | Yonezawa et al. | 269/309 |
| 7,425,000 B2 * | 9/2008 | Stark | 269/309 |
| 2004/0256779 A1 * | 12/2004 | Kawakami | 269/309 |
| 2007/0210501 A1 * | 9/2007 | Stark | 269/309 |

FOREIGN PATENT DOCUMENTS

| | | |
|---|---|---|
| DE | 198 34 040 A1 | 2/2000 |
| DE | 100 06 847 A1 | 9/2001 |
| DE | 202 19 338 U1 | 2/2003 |
| EP | 0 936 025 A | 8/1999 |

* cited by examiner

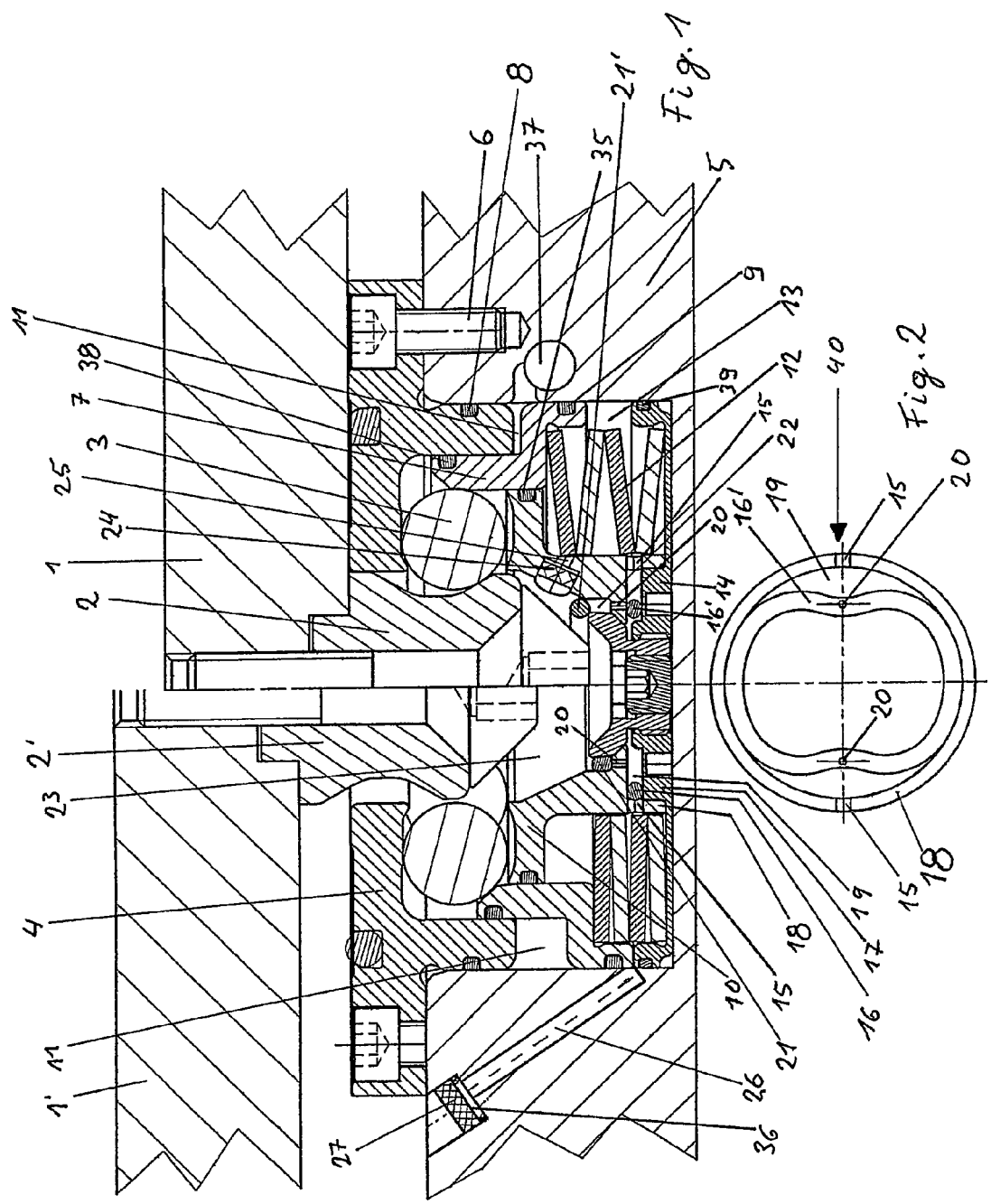

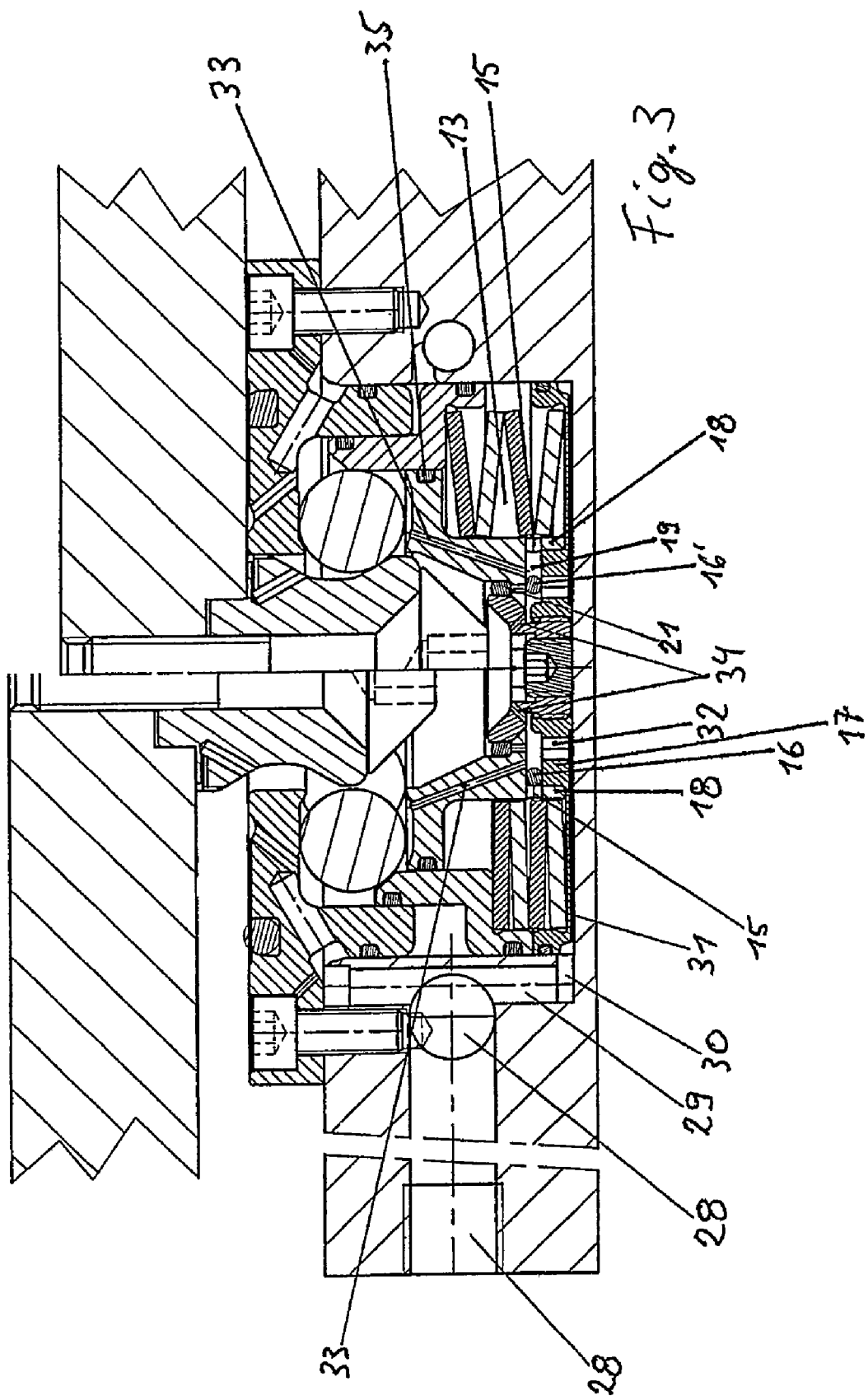

QUICK-ACTION CLAMPING CYLINDER WITH AN ANTI-BLOCKING SAFETY DEVICE

BACKGROUND OF THE INVENTION

The invention is directed to a quick-action cylinder with a safety device to prevent blocking including a mechanical lock for a center draw-in nipple in a center bore in a housing. In the locked position, one or more locking members are urged into contact with an exterior periphery of the draw-in nipple by a force of a spring assembly which is arranged in the housing in one or several spring compartments. The unlocked position of the draw-in nipple is achieved by applying pressure to a locking piston which operates to oppose the force of the spring assembly, wherein at least one relief bore which extends to a clearance space having a lower pressure is arranged in the spring compartment.

Quick-action cylinders of the aforedescribed type have been described in a number of publications. For example, reference is made to DE 198 34 040 A1 or DE 198 34 040 C2 where the basic functionality is described. The disclosure of the aforedescribed patent applications is included in the present disclosure by reference in its entirety.

Quick-action cylinders of the aforedescribed type operate with a mechanical lock for the draw-in nipple secured on a workpiece palette. It is known to lock a draw-in nipple which is pulled into the housing of the quick-action cylinder by a spring force. The draw-in nipple is locked using locking members which contact the periphery of the draw-in nipple and hold the draw-in nipple in the locked position in the housing of the quick-action cylinder.

The locked position is achieved by springs which are typically implemented as disk springs and are supported at one end on the bottom face of the quick-action cylinder and at the other end by a locking piston operated by a hydraulic fluid or compressed air.

Instead of the aforedescribed disk springs, other types of energy stores known in the art can also be used. It is a characteristic feature of this type of quick-action cylinders that the locking members are locked with the draw-in nipple by way of a spring force and are unlocked by applying pressure from a hydraulic fluid or compressed air.

For the sake of clarity of the following description, only the application of a pressure medium in the form of a hydraulic fluid is described, although the invention can also be used with other pressure media, for example glycol, air and the like.

For unlocking, a pressure medium is introduced between the housing and the movable sealed locking piston, wherein the pressure medium moves the locking piston against the force of the springs so as to release the locking members and disengage them from the draw-in nipple.

For this type of quick-action cylinders, it is also necessary to provide a dependable seal between the center bore, in which the draw-in nipple is inserted, and the radially outwardly disposed spring compartments which receive the spring assembly.

If this seal is defective, then there is a risk that water entering the center bore may reach the adjacent spring compartment, potentially damaging the spring assembly through corrosion. The spring compartment is therefore typically sealed to keep out contaminants. The spring compartment is hence hermetically sealed against the other housing components.

In has been observed in several applications that the seal between the locking piston and the housing became defective or was already damaged during assembly of the quick-action cylinder. As a result, when a pressure medium was introduced into the cylinder space, this medium was then able to reach the (sealed) spring compartment via the defective seal. Such operating condition rendered the quick-action cylinder inoperative due to self-blocking.

When the hydraulic fluid reached the spring compartment due to inadequate sealing between the cylinder and the housing of the quick-action cylinder, then the spring compartment filled up with hydraulic fluid, thus blocking the locking piston, because the springs act in opposition to the locking piston. The cylinder compartment filled with the hydraulic fluid acted on one side of the locking piston, whereas the same hydraulic fluid acted on the locking piston from the other side (with a significantly larger area). This blocked the locking piston, because the spring force of the spring assembly was applied in addition to the force exerted on the locking piston in addition by the leaking hydraulic fluid from below.

The quick-action cylinder could the no longer be unlocked, eliminating any possibility to access the quick-action cylinder from the outside for unlocking the cylinder, because the top side of the quick-action cylinder was typically covered by the screwed-on change palette and the bottom side of the quick-action cylinder was mounted in a recessed receiving opening in the support table. The quick-action cylinder was therefore no longer accessible from the outside in the operating state, and the aforementioned blocking caused by defective seals could no longer be remedied.

The only possible solution was then to increase the hydraulic pressure on the locking piston in the cylinder to a point where the cover was blown off upwardly, which was associated with a substantial risk for injury.

DE 100 06 847 C2 discloses a simple discharge bore from the spring compartment to the center bore to discharge contaminated water entering the spring compartment through the discharge bore to the center bore. For this purpose, the discharge bore was connected to the bottom section of the spring compartment for completely removing the water.

However, it has been observed that this type of water removal from the spring compartment is not adequate for preventing contaminated water, in particular water contaminated with chips, from entering the spring compartment.

Water is typically removed from the center bore by blowing the water out with a compressed air gun. However, water contaminated with chips is thereby pushed into the discharge bore and thereby also into the spring compartment which can seriously damage the spring assembly.

In addition, when the draw-in bolt enters the center bore, an overpressure is produced which presses the water, which is contaminated with chips and deposited on the bottom of the center bore, through the discharge bore into the spring compartment.

An additional air supply channel must therefore be provided on the top side of the spring compartment. The contaminated spring compartment must then be cleaned by blowing in air, returning the water contaminated with chips to the center bore.

The discharge bore which transports unpressurized water can also be obstructed by inflowing contaminants. Such an arrangement is therefore not suited to prevent blocking of the locking device if contaminated water enters the spring compartment.

BRIEF SUMMARY OR THE INVENTION

It is therefore an object of the invention to improve a quick-action cylinder of the aforedescribed type which prevents the spring-biased locking device from being blocked if seals are defective.

The object of the invention is solved by providing a valve member or a pressure element which is arranged in the region of the relief bore and moved into an open position in the event of an overpressure in the spring compartment.

It is an important feature of the invention that a relief bore, which leads to an externally accessible clearance space, is arranged at least in the spring compartment and that a valve body is arranged in the region of the relief bore, with the valve body moving into an open position when an overpressure exists in the spring compartment.

The technical teaching discussed above provides an essential advantage in that if leaking a hydraulic fluid (or another pressure medium) enters the spring compartment, this pressure medium also enters the relief bore in the spring compartment and a corresponding valve to open so as to relieve the pressure.

As a result, a pressure which further amplifies the force from the springs and which would be sufficient to maintain the locking piston in the locked position against the locking members can then no longer build up in the spring compartment.

Any pressure buildup in the spring compartment is eliminated by the aforedescribed valve arrangement.

Several exemplary embodiments of the valve arrangement encompassing the same inventive concept will now be described.

In a first embodiment of the invention, at least one bore extends into the spring compartment, terminating in a clearance space where at least one deformable valve body is arranged.

According to an advantageous embodiment of the invention, the deformable valve body is implemented as a control ring which deforms under effect of a corresponding pressure medium and unblocks a relief bore as a result of this deformation.

The relief bore can, for example, extend to the center bore of the quick-action cylinder, so that hydraulic fluid entering the spring compartment flows out to the center bore without causing damage.

An operator of the quick-action cylinder can therefore easily recognize by inspecting the center bore if one or several seals of the quick-action cylinder are damaged.

In another embodiment of the present invention, the deformable valve body can be implemented as a pressure plug which is inserted in the relief bore in the pressure relief direction of the hydraulic fluid and is held in the relief bore by frictional engagement.

If the pressure in the sealed spring compartment increases to a point where the pressure also operates on the pressure plug via the relief bore, then the plug is ejected from the relief bore after a certain pressure increase, allowing the hydraulic fluid to flow out of the spring compartment.

Preferably, the effective surface area over which the hydraulic fluid contacts the pressure plug can be selected to be large enough so that already a relatively small pressure drives the pressure plug out of the relief bore.

However, the invention is not limited to deformable control rings or pressure plugs.

In a third embodiment, a diaphragm valve can be used which can seal one or several relief bores along its periphery, wherein the membrane of the diaphragm valve deforms under the effect of the pressure medium, thereby opening the a corresponding relief bore to the clearance space.

It is also possible to provide so-called spring-biased valves (pressure relief valves) where a valve element is pressed against a control surface against the force of a control spring. When the spring force of the control spring is exceeded, the valve element is lifted from the control surface and the hydraulic fluid flows out into the open through the relief bore.

The subject matter of the present invention is not limited by the features recited in the individual claims, but encompasses also combinations of the individual claims.

All information and features disclosed in the specification, as well as in the summary, and particularly the spatial arrangement depicted in the drawings, are part of the invention, if they are novel and inventive, either alone or in combination.

Several exemplary embodiments of the invention will now be described with reference to the drawings. Additional inventive features and advantages of the invention are disclosed in the drawings and the corresponding description.

BRIEF DESCRIPTION OF THE DRAWINGS

It is shown in:

FIG. 1 a cross-section through a first embodiment of a quick-action cylinder without blow-out device;

FIG. 2 a section at the height of the intermediate space between the ball support and the spring support of the quick-action cylinder; and FIG. 3 a quick-action cylinder according to FIG. 1 with an additional blow-out device.

FIGS. 1 to 3 show a quick action cylinder of the type described in numerous published applications. Reference is made to the disclosure of the existing, already published applications.

DETAILED DESCRIPTION OF THE INVENTION

One or more vises or clamping means holding the workpieces to the machined are typically mounted on a change-over platen 1. The change-over platen 1 is connected with a draw-in nipple which is inserted in a central bore 23 of the quick-action cylinder, where it can be locked.

The quick-action cylinder has an upper cover 4 which is screwed on a corresponding machining or support table 5 with screws 6.

Instead of mounting the entire housing of the quick-action cylinder in an associated recess in the support table 5, so-called build-up solutions exist where the entire housing is screwed on the top surface of a support table 5.

The right-hand side of FIG. 1 illustrates how the draw-in nipple 2 is locked by locking members 3, with the relieved and unlocked state shown on the left-hand side of FIG. 1.

The locking member 3 is locked by a locking piston 7 actuated by a hydraulic fluid. The locking piston 7 sealingly contacts, on one hand, the inside of a ball support 10 with way of seals 9, 35 and, on the other hand, the inside of the central recess in the support table 5, where it is displaceable.

The cover 4 has an axial projection which also sealingly contacts with at least one seal 8 the inside of the central recess in the support table 5.

For unlocking the locking piston 7, a pressure medium is introduced into the pressure space 11 through the hydraulic fluid connection 37. The pressure space 11 is sealed by the seals 9, 35 and 38.

When the hydraulic fluid is introduced into the pressure space 11, the locking piston 7 is moved downwardly in the axial direction, as shown on the left-hand side of FIG. 1. The locking members 3 then disengage from the corresponding locking surfaces on the draw-in nipple 2, so that the draw-in nipple can now be freely pulled out of the central bore 23 of the housing of the quick-action cylinder in an upward direction.

If, for example, the seal 9 on the locking piston 7 is defective, then it may happen that hydraulic fluid flows from the pressure space 11 through the defective seal 9 into the sealed spring compartment 13 located below.

A disk spring assembly made of compression springs 12 is arranged in the spring compartment 13, with the disk spring assembly acting against the bottom side of the locking piston 7.

The spring compartment 13 is sealed by a seal 39 against the recess in the support table 5 below.

The springs are hereby supported by a plate-shaped spring support 14 which is sealed by the seal 39 toward the bottom.

The locking members 3 are supported by a ball support 10 which has radially outwardly oriented surfaces that form opposing surfaces for the locking piston 7.

In the absence of the safety device according to the invention, the spring compartment 13 would fill with hydraulic fluid and the hydraulic fluid together with the spring force of compression spring 12 would operate onto the bottom side of the locking piston 7, thereby holding the piston 7 in the locked position as shown in the diagram on the right-hand side of FIG. 1. This locked position can no longer be unlocked. For unlocking the device, hydraulic fluid would have to be introduced into the pressure space 11 through the hydraulic fluid connection 37, which however is impossible to achieved because the seal 9 is defective.

According to the invention, a bore 15 is arranged in at least one location of the spring compartment 13 and oriented to the outside for providing pressure relief.

In the first exemplary embodiment depicted in FIG. 1, the bore 15 which interrupts the seal of spring compartment 13 extends into a clearance space 19 where a deformable control ring 16 is arranged.

According to a preferred embodiment, the control ring 16 is implemented as a deformable O-ring, which is freely deformable in the clearance space 19.

When the hydraulic fluid flows through the bore 15 into the clearance space 19 in the direction arrow 40, the control ring 16 is pressurized because it seals at the top and at the bottom against the clearance space 19. The effect of the pressure medium will cause an approximately oval deformation of the control ring 16, as indicated in FIG. 2, thereby unblocking a relief bore 20 located above in the clearance space.

In the diagram of FIG. 2, the deformed control ring 16 has not yet completely unblocked the depicted relief bore 20. The depicted relief bore 20 will be unblocked more when the control ring 16 deforms further radially inward, as depicted in FIG. 2.

The hydraulic fluid then flows through the relief bore 20 against a sealing ring 21 which is arranged in the intermediate space between the ball support 10 and a nut securing the spring assembly.

The sealing ring 21 is also located in a receiving space 22, from which the sealing ring is displaced upwardly in the receiving space 22 by the action of the pressure medium, as indicated on the right-hand side of FIG. 1 by the reference symbol 21'.

According to the first embodiment of the safety device of the invention, two different rings are deformed, namely on one hand the control ring 16 and, on the other hand, the sealing ring 21.

After deformation of the sealing ring 21 into position 21', the hydraulic fluid now flows into the center bore 23, from where it can be easily removed. As soon as the leaked oil enters the center bore 23, the pressure in the spring compartment 13 is removed and the locking piston 7 moves downwardly into its unlocked position by applying additional pressure at the hydraulic fluid fitting 37, as depicted on the left-hand side of FIG. 1.

It should be mentioned for sake of completeness that the ball support 10 has an axial downwardly extending projection 18 contacting the sidewall on the spring compartment 13 and that the bore 15 is arranged in the region of this projection 18 of the ball support 10.

The projection 18 is followed by an additional axial projection 17 of the spring support 14. The aforementioned clearance space 19 where the deformable control ring 16, 16' is located is arranged in the region of the projection 17.

FIG. 1 shows two additional exemplary embodiments which operate entirely independent of the first-mentioned exemplary embodiment, for which separate patent protection (with reference to the other exemplary embodiments) is desired.

The right-hand side of FIG. 1 shows that the spring compartment 13 is provided with a relief bore 25 which extends into the center bore 23 and that a pressure plug 24 is arranged in the region of the relief bore 25. The pressure plug 24 is pushed out towards the center bore 23 if pressure in the relief bore 25 increases.

With the pressure plug 24 removed, the hydraulic fluid then also flows into the center bore 23.

The left-hand side of FIG. 1 shows a third exemplary embodiment with a relief bore 26 connected to a gap of the spring compartment which leads to the outside. A pressure plug 27 is inserted in the relief bore 26, as seen in the opening direction.

To be able to push the pressure plug 27 out of the relief bore 26 with a large force even at small pressure, the relief bore 26 is augmented in the region of the pressure plug 27 by a pressure surface 36 having an increased diameter, so that a corresponding pressure increase in the relief bore 26 generates an effective push-out force on the pressure plug 27.

The pressure surface 26 can be bounded by a limit stop so as to leave an opposing pressure surface 36 unobstructed when the pressure plug 27 is inserted.

FIG. 3 shows a quick-action cylinder of the same type shown in FIG. 1, except that an additional so-called blow-out device is provided. The blow-out device can be used to introduce compressed air into the interior space of the quick-action cylinder through an air supply fitting 28. The blow-out device branches towards the top and the bottom via a longitudinal bore 29, so that different parts in the quick-action cylinder can be cleaned with compressed air.

With this measure, dirt, chips and other contaminants entering the interior space of the quick-action cylinder can be blown off from critical surfaces of the quick-action cylinder.

FIG. 3 shows the use of blow-out channels for the blast air for relieving hydraulic fluid from the spring compartment.

As shown in FIG. 3, the spring compartment 13 is open to the outside through the aforementioned bore 15 in projection 18 and the deformable seal 16 is arranged in the clearance space 19.

When the seal is deformed in the manner depicted in FIG. 2, the mouth of the blow bore 33 becomes unobstructed, and the hydraulic fluid flows upward through the blow bore 33 towards the ball support of the locking members 3.

In addition, the hydraulic fluid can also be discharged through the now unobstructed bore 32 for the air channel, from where the fluid reaches a release position 30 through an air channel 31, and from there to the longitudinal bore 29, for introducing compressed air.

In this may, the hydraulic fluid is not forced to flow into the center bore 23, but it can also flow into the blow openings or may even exit at the fitting for the air supply 28.

Accordingly, a different discharge channel is used for the hydraulic fluid than, for example, in FIG. 1.

When the hydraulic fluid flows into the bottom bore 32, the hydraulic fluid can also flow into the center bore 23 through the blow bore 34 provided for the air supply.

It is therefore important for all measures that at least one relief bore with at least one valve is arranged in the region of the sealed spring compartment, with the valve opening to the outside if overpressure builds up in the spring compartment, thereby discharging the pressure medium.

The invention provides several possibilities where the hydraulic fluid can finally flow. The hydraulic fluid can flow into the center bore 23, or also into the air channels provided for blowing out a quick-action cylinder with air according to FIG. 3.

As indicated on the left-hand side of FIG. 1, the hydraulic fluid can also be discharged directly at the support table 5.

The same approach can be used for a top-mounted cylinder where the hydraulic fluid can exit the housing of the cylinder.

All disclosed measures advantageously prevent the aforementioned detrimental blocking position of the locking piston at the locking members, even if one or several seals in the interior space of the quick-action cylinder are damaged.

The invention claimed is:

1. A quick-action cylinder with a safety device to prevent blocking of a draw-in nipple, comprising
    a housing having a center bore receiving the draw-in nipple;
    at least one locking member disposed in the housing and adapted to engage with the draw-in nipple; a spring assembly disposed in the housing in at least one spring compartment, said spring assembly applying a spring force to urge the least one locking member into contact with an exterior periphery of the draw-in nipple for locating the draw-in nipple in the center bore, a locking piston disposed in the housing and operative to oppose the spring force for unlocking the draw-in nipple, at least one relief bore extending between the at least one spring compartment and a clearance space having a lower pressure than the spring compartment, and a pressure element arrange in a region of the relief bore and adapted to move into an open position in the event of an overpressure in the spring compartment.

2. The quick-action cylinder of claim 1, wherein the pressure element comprises a valve.

3. The quick-action cylinder of claim 2, wherein the valve comprises a pressure relief valve arranged in the at least one relief bore and having a valve body, a control surface and a resilient control member, wherein in a closed position of the pressure relief valve the valve body is urged against the control surface by the force of the resilient control member, and wherein in an open position the valve body is connected for fluid conduction with the relief bore.

4. The quick-action cylinder of claim 3, wherein the pressure relief valve comprises a spring-biased valve and the resilient control member comprises a control spring.

5. The quick-action cylinder of claim 1, wherein the pressure element comprises at least one deformable pressure member arranged in the clearance space.

6. The quick-action cylinder of claim 5, wherein the at least one deformable pressure member comprises a control ring which undergoes a deformation when a pressure is applied by a pressure medium and opens the at least one relief bore as a result of the deformation.

7. The quick-action cylinder of claim 5, wherein the at least one deformable pressure member comprises a pressure plug which is in friction engagement with the at least one relief bore and has a pressure relief direction of a pressure medium applied to the locking position.

8. The quick-action cylinder of claim 1, wherein the at least one relief bore extends to the center bore of the quick-action cylinder.

9. The quick-action cylinder of claim 5, wherein the at least one deformable pressure member comprises a diaphragm valve having a membrane with a peripheral region which, in an undeformed state, closes at least one relief bore, said membrane undergoing a deformation when a pressure is applied by a pressure medium and opening the at least one relief bore for fluid conduction into the clearance space.

10. The quick-action cylinder of claim 1, wherein the locking piston is operated by a pressure medium.

11. The quick-action cylinder of claim 10, wherein the pressure medium comprises a hydraulic fluid.

* * * * *

UNITED STATES PATENT AND TRADEMARK OFFICE
CERTIFICATE OF CORRECTION

PATENT NO. : 7,748,690 B2  Page 1 of 1
APPLICATION NO. : 10/588676
DATED : July 6, 2010
INVENTOR(S) : Günther Jakob Stark It is certified that error appears in the above-identified patent and that said Letters Patent is hereby corrected as shown below:

Column 3, line 1, "BRIEF SUMMARY OR THE INVENTION"

should read --BRIEF SUMMARY OF THE INVENTION--

Column 8, line 2, "arrange"

should read --arranged--

Signed and Sealed this
Fifteenth Day of November, 2011

David J. Kappos
*Director of the United States Patent and Trademark Office*